US007779280B2

(12) United States Patent  (10) Patent No.: US 7,779,280 B2
Shuster  (45) Date of Patent: Aug. 17, 2010

(54) LOW POWER MODE FOR PORTABLE COMPUTER SYSTEM

(76) Inventor: Gary Stephen Shuster, P.O. Box 11289, Zephr Cove, NV (US) 89448

( * ) Notice: Subject to any disclaimer, the term of this patent is extended or adjusted under 35 U.S.C. 154(b) by 860 days.

(21) Appl. No.: 11/532,863

(22) Filed: Sep. 18, 2006

(65) Prior Publication Data

US 2007/0067655 A1    Mar. 22, 2007

Related U.S. Application Data

(60) Provisional application No. 60/718,152, filed on Sep. 16, 2005.

(51) Int. Cl.
*G06F 1/00* (2006.01)
*G06F 1/26* (2006.01)
*G06F 1/32* (2006.01)

(52) U.S. Cl. ...................... 713/320; 713/300
(58) Field of Classification Search .......... 713/300, 713/320
See application file for complete search history.

(56) References Cited

U.S. PATENT DOCUMENTS

| 4,611,289 | A  | * | 9/1986  | Coppola ............... 713/300 |
| 5,715,464 | A  | * | 2/1998  | Crump et al. .......... 713/323 |
| 5,878,264 | A  | * | 3/1999  | Ebrahim ............... 713/323 |
| 6,144,976 | A  |   | 11/2000 | Silva et al. |
| 2002/0173344 | A1 |   | 11/2002 | Cupps et al. |
| 2003/0088800 | A1 | * | 5/2003  | Cai .................... 713/320 |
| 2003/0135288 | A1 |   | 7/2003  | Ranganathan et al. |
| 2003/0188144 | A1 | * | 10/2003 | Du et al. ............... 713/1 |
| 2005/0054326 | A1 |   | 3/2005  | Rogers |
| 2005/0055570 | A1 |   | 3/2005  | Kwan et al. |
| 2005/0182980 | A1 |   | 8/2005  | Sutardja et al. |
| 2005/0278559 | A1 | * | 12/2005 | Sutardja et al. ........ 713/320 |
| 2006/0212736 | A1 | * | 9/2006  | Kimura ................. 713/323 |
| 2008/0141049 | A1 | * | 6/2008  | Hassan et al. .......... 713/320 |

FOREIGN PATENT DOCUMENTS

JP          07020967 A  *  1/1995
WO    WO 2004/075034 A2     9/2004

OTHER PUBLICATIONS

International Search Report and Written Opinion, PCT/US/2006/035245 Dated Mar. 20, 2008.

* cited by examiner

*Primary Examiner*—Mark Connolly
(74) *Attorney, Agent, or Firm*—Knobbe Martens Olson & Bear, LLP

(57) ABSTRACT

A computer system is configured to operate in a normal mode and in a reduced power mode. The normal mode utilizes a primary processor, which operates using a primary operating system. When system power is depleted to a defined level, the primary processor is shut down and certain operations are taken over by a low-power, secondary processor that operates using a secondary operating system.

30 Claims, 2 Drawing Sheets

LOW POWER MODE FOR PORTABLE COMPUTER SYSTEM

CROSS-REFERENCE TO RELATED APPLICATION

This application claims priority pursuant to 35 U.S.C. §119(e) to U.S. provisional application Ser. No. 60/718,152, filed Sep. 16, 2005, which application is specifically incorporated herein, in its entirety, by reference.

BACKGROUND OF THE INVENTION

1. Field of the Invention

The present invention relates to a system and method for managing power useful for battery-powered (or other limited-powered) computers.

2. Description of Related Art

Computers of various types, including laptop computers, desktop computers, handheld computers and other computers, typically take significant time to "boot up". In addition, portable computers frequently run out of power when in use. This may interrupt a critical task or render the computer inoperable until another source of power can be found or the battery can be recharged.

SUMMARY OF THE INVENTION

The invention is directed to a system and method for managing power useful for battery-powered (or other limited-powered) computers, such as laptop computers, electronic organizers, and the like. According to the disclosure, a battery-powered computer is equipped with a dual operating system for power conservation. Specifically, the computer is equipped with a primary operating system for normal, full-power operation. A secondary operating system permits continued use of the data entry capabilities of the computer during reduced-power operation, without the need to wait for the primary operating system to boot and without the need for sufficient power to run the primary operating system.

The term "laptop" in this disclosure can also be used to describe other portable computers powered by batteries, fuel cells, or other power sources having a limited capacity.

According to the invention, the computer utilizes normal power management techniques, shutting down before all battery life is discharged. However, a small reserve is maintained in the battery. This reserve is used to power the secondary operating system contained in ROM, flash memory, or some other persistent, low-power memory device. The secondary operating system can run on the primary processor and RAM, but in the preferred embodiment runs on an entirely separate, very low-power processor and RAM that can be booted without powering on the primary processor. The secondary operating system uses either a dedicated, tiny liquid crystal or similar small one or two line low power display, although other displays and even all or a portion of the primary laptop display can be used. In the preferred method, a small LCD display is mounted above the keyboard and may optionally be backlit. In another method, the system does not use a display at all to conserve power. An alternative method uses sound clicks to indicate key presses. Only those portions of the computing device necessary to the functioning of the secondary operating system need to be powered up, permitting significant power savings.

The secondary operating system permits entry of data (via an external keyboard, the attached laptop keyboard, or other device such as a drawing stylus) for storage in a secondary memory device that is persistent without use of power (such as flash memory). Entry of data can also be made by microphone, video camera or other suitable input device. Output of data can be made the same way, such as by speaker, video display, etc.

The low-power secondary memory device is accessible from the main operating system as well, and data entered using the low power secondary operating system can be imported to applications running in the primary operating system. Optionally, data from the primary operating system can be exported to the secondary memory device as well. In addition, the secondary memory device may be removable and readable from other devices.

A more complete understanding of the invention will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

Figure 1:
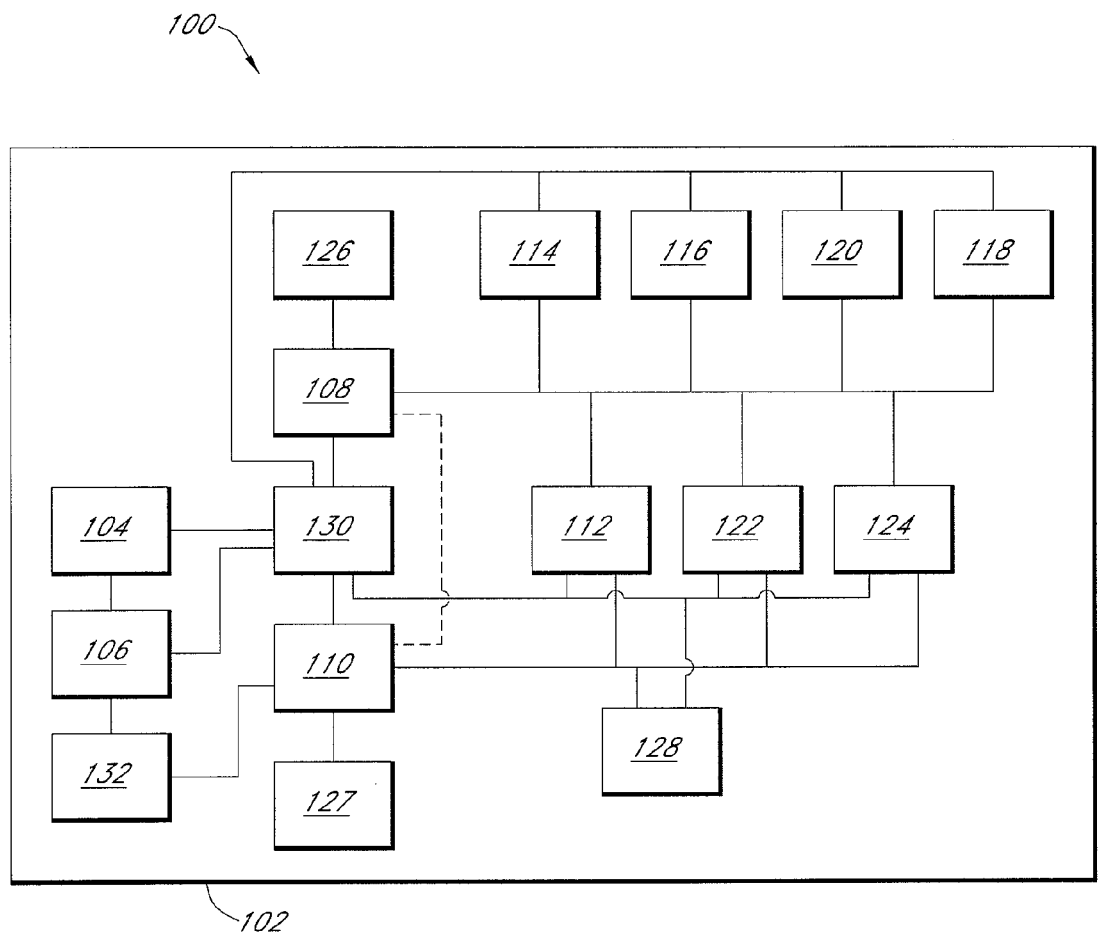
FIG. 1 is a block diagram showing an exemplary system according to the invention.

FIG. 1 shows a system 100 comprising a portable computer 102 powered by a battery (or other limited source, such as a fuel cell) 104. Computer 102 comprises a battery monitor 106 that monitors battery power, connected to a primary processor 108 and a secondary processor 110. In an embodiment of the invention, processors 108 and 110 are separate devices. In an alternative embodiment, the secondary processor comprises a portion of the primary processor that can be operated separately. In both embodiments, the secondary processor can be booted up and operated independently, which should occur when the battery reaches a defined depletion level, e.g., 75% depleted.

Primary processor 108 is connected to and operable with all normal computer and peripheral components, for example, keyboard 112, pointer 114, graphic display screen 116, network card 118, optical disk drive 120, magnetic storage device 122, audio output device 124 and a first RAM bank 126. When the primary processor is operating, battery power is depleted at a certain rate ("primary rate") depending on the power requirements of the processor and other computer components. Secondary processor 110 is connected to and operable with a subset of computer components, for example, keyboard 112 and audio output device 124. In addition, secondary processor 110 may be connected to and operable with certain low-power components, for example low-power RAM bank 127 and low-power LCD screen 128. When the primary processors and its interoperable components are shut down and the secondary processor and its interoperable components are operating, battery power is depleted at a certain rate ("secondary rate") depending on the power requirements of the processor and its interoperable components. In an embodiment of the invention, the system 100 is designed such that the secondary rate is much less than the primary rate, for example, 50% less, 75% less, or 90% less.

A switch 130 may be used to control power distribution. For example, in a first operating mode, power is distributed to the primary processor 108 and its connected components. In a second operating mode, power is distributed to secondary processor 110 and its connected components. Switch 130 may be controlled by secondary processor 110 during both normal (primary) and low-power (secondary) operating modes. In the alternative, switch 130 may be controlled by an independent device, such as a low-power sensor and logic chip (not shown), which may be integrated with switch 130 in a single device. The low-power sensor may comprise, for example, a voltage or current sensor. When the sensed voltage or current falls to a predefined threshold, battery power may be presumed to have fallen to a predetermined level of remaining storage capacity.

The usefulness of the system 100 may be greatly extended by switching to the secondary processor when battery power reaches a predetermined level. For example, the predetermined level may be set at 20% of remaining battery power. At the primary power rate, a battery may have a life of, for example, two hours. If the secondary power rate is one-fifth of the primary rate (80% less), the computer may be operated for 96 minutes from 100% battery reserves to 20%, i.e., 80% times 120 minutes. Then, it may be operated for an additional 120 minutes in the low-power mode until the battery is completely depleted. It should be apparent that many other scenarios for extending computer time are possible, depending on the predetermined battery reserve level, the secondary rate, and the primary rate. Such variables may be made user-selectable, to the extent possible. For example, a user may select certain components to be used, thereby varying the secondary power rate, or may set the battery threshold at which power is switched to the secondary processor.

The primary processor and secondary processor may utilize separate operating systems stored in separate memories. When the primary processor is shutting down, certain machine state data may be transferred to a RAM bank or other memory device associated with the secondary processor. Other machine state data may be discarded, preferably after first ensuring that all data of interest to the user is stored in a non-volatile memory so that it can be recovered later. The secondary processor may follow a similar procedure when it is shutting down. Conversely, when either the primary or secondary processors are booting up, each can be configured to make appropriate use of any non-volatile data stored by its counterpart processor. The secondary processor may also make use of certain machine state or other data that may be provided by the primary processor.

Machine state or user data may be stored by the secondary processor in a secondary memory device 132, which may comprise a low-power device. The low-power secondary memory device 132 may be accessible from the main operating system as well. Thus, data entered using the low power secondary operating system can be imported to applications running in the primary operating system. Optionally, data from the primary operating system can be exported to the secondary memory device as well. Memory device 132 may be used for this purpose, also. In addition, the secondary memory device may be removable and readable from other devices. For example, memory 132 may be incorporated into a package (not shown) including a USB or other interface for plugging into a socket of the computer system. Thus, even when a battery is about to become discharged to an inoperable level, the user may ensure that critical data is stored on memory 132 for use on an alternative computer system.

Various tasks may be performed in low-power mode, for example, receiving or responding to text messages, reviewing text documents, or any other task that requires substantially less power than tasks performed during a normal operating mode. The secondary operating system should permit entry of user data (via an external keyboard, the attached laptop keyboard, or other device such as a drawing stylus) for storage in a secondary memory device 132 that is persistent without use of power (such as flash memory). Entry of data may also be made by microphone, video camera or other suitable input device.

Optionally, the secondary processor 110 and its interoperable components may be switched on and off as desired, i.e., booted up or shut down when desired to force operation of the system in the low-power mode. Likewise, the system may be forced to operate in normal mode until battery power is completely depleted, or for any other purpose.

Figure 2:
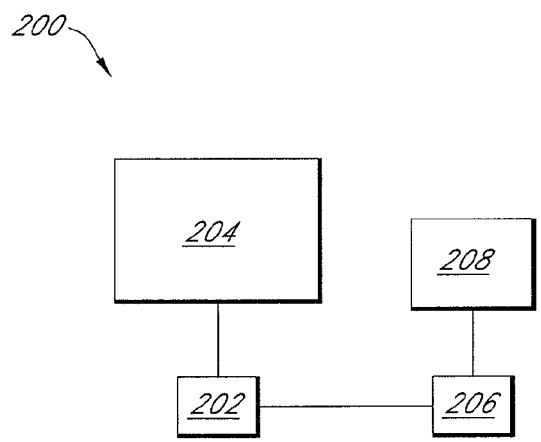
FIG. 2 is a block diagram showing an exemplary system according to the invention.

Current gas plasma or LCD displays may consume power at a rate that is higher than desirable. However, it may still be desirable to provide a visual display during reduced-power operation. Accordingly, in an embodiment of the invention as shown by FIG. 2, a computer system 200 may comprise a primary processor 202 operably associated with a first display screen 204, such as, for example, an LCD or gas plasma display screen. Normally all of screen 204 will be illuminated when the computer system is in a normal operating mode. System 200 may also comprise a secondary processor 206 operably associated with a secondary display 208. The secondary display 208 should be configured to consume substantially less power than the primary display 204. For example, the secondary display may be substantially smaller in area, or utilize a technology that requires less power to operate. In an embodiment of the invention, display 208 may comprise a dedicated, tiny liquid crystal or similar small one or two line low power display. For example, a small LCD display 208 may be mounted above the keyboard and may optionally be backlit.

Figure 3:
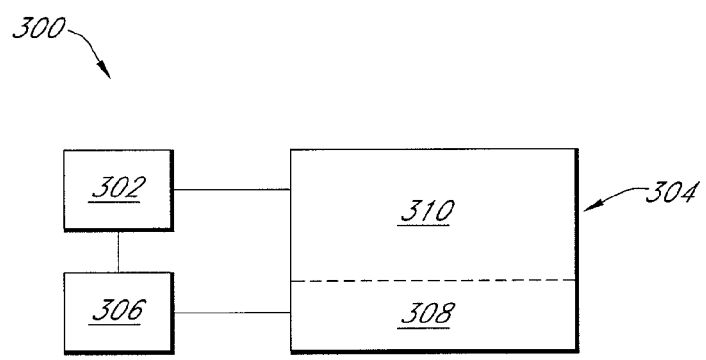
FIG. 3 is a block diagram showing an exemplary system according to the invention.

In the alternative, as shown in FIG. 3, a computer system 300 may be configured with the primary processor 302 operably associated with a display screen 304. Screen 304 and system 300 may be configured such that substantially the entirety of display screen 304 is utilized for providing a visual display, when system 300 is in normal mode. When operating in reduced-power mode using secondary processor 306, a reduced region 308 may be utilized for providing a visually display, with the remainder 310 blanked. Screen 304 should be selected so that less or no power is needed to maintain a region 310 of the screen in a blank state while utilizing another region 308 to provide a visual display.

Having thus described a preferred embodiment of invention, it should be apparent to those skilled in the art that certain advantages of the within system have been achieved. It should also be appreciated that various modifications, adaptations, and alternative embodiments thereof may be made within the scope and spirit of the present invention. For example, an embodiment in which the primary and secondary processors are located on separate devices has been illustrated, but it should be apparent that the invention may be implemented using primary and secondary devices located in different areas or components of a single device. The invention is defined by the appended claims.

What is claimed is:

1. A computer-implemented method of managing power for a computing device, comprising:
   under control of a configured computer system having:
   a primary processor in communication with a primary memory that stores machine state data, wherein the primary processor is configured to consume power at a first rate, and a secondary processor in communication with a secondary memory, wherein the secondary processor is configured to consume power at a second rate that is less than the first rate;

distributing power to the primary processor from a power source responsive to the power source level above a selected level;

distributing power to the secondary processor instead of the primary processor responsive to the power source level at or below the selected level; and transferring at least a first portion of the machine state data from the primary memory to the secondary memory during switching the power distribution from the primary processor to the secondary processor;

wherein at least a second portion of the machine state data that is not transferred to the secondary memory is stored in a non-volatile memory.

2. The computer-implemented method of claim 1, wherein at least a third portion of the machine state data not transferred to the secondary memory is discarded.

3. The computer-implemented method of claim 1, wherein the first portion of the machine state data that is transferred to the secondary memory is stored in a non-volatile memory upon shutdown of the secondary processor.

4. The computer-implemented method of claim 1, wherein the primary and secondary memories are volatile memories.

5. The computer-implemented method of claim 1, wherein the primary memory comprises primary operating system instructions.

6. The computer-implemented method of claim 5, wherein the secondary memory comprises secondary operating system instructions.

7. The computer-implemented method of claim 6, wherein the secondary processor is in communication with a removeable, non-volatile secondary memory device.

8. The computer-implemented method of claim 7, wherein the non-volatile secondary memory device is accessible from the primary operating system.

9. A computer-readable storage medium encoded thereon with instructions that, when executed, cause a computing system to perform operations comprising:

distributing power to a primary processor from a power source responsive to the power source level above a selected level, the primary processor configured to communicate with a primary memory that stores machine state data and configured to consume power at a first rate during operation;

distributing power to a secondary processor instead of the primary processor responsive to the power source depleted below the selected level, the secondary processor being in communication configured to communicate with a secondary memory and configured to consume power at a second rate less than the first rate;

distributing at least a first portion of the machine state data from the primary memory to the secondary memory during switching the power distribution from the primary processor to the secondary processor; and storing at least a second portion of the machine state data that is not transferred to the secondary memory in a non-volatile memory.

10. The computer-readable storage medium of claim 9, further configured to discard at least a third portion of the machine state data not transferred to the secondary memory.

11. The computer-readable storage medium of claim 9, further configured to store the first portion of the machine state data that is transferred to the secondary memory in a non-volatile memory upon shutdown of the secondary processor.

12. The computer-readable storage medium of claim 9, wherein the primary and secondary memories are volatile memories.

13. The computer-readable storage medium of claim 9, wherein the primary memory comprises primary operating system instructions.

14. The computer-readable storage medium of claim 13, wherein the secondary memory comprises secondary operating system instructions.

15. The computer-readable storage medium of claim 14, wherein the secondary processor is configured to communicate with a removable, non-volatile secondary memory device.

16. The computer-readable storage medium of claim 15, wherein the non-volatile secondary memory device is accessible from the primary operating system.

17. A computer system, comprising:

a primary processor in communication with a primary memory that stores machine state data, wherein the primary processor is configured to consume power at a first rate, and a secondary processor in communication with a secondary memory, wherein the secondary processor is configured to consume power at a second rate that is less than the first rate;

a switch configured to distribute power to the primary processor from a power source responsive to the power source level above a selected level and to distribute power to the secondary processor instead of the primary processor responsive to the power source level at or below the selected level; and wherein the primary processor is further configured to transfer at least a first portion of the machine state data from the primary memory to the secondary memory during switching the power distribution from the primary processor to the secondary processor and at least a second portion of the machine state data that is not transferred to the secondary memory is stored in a non-volatile memory.

18. The system of claim 17, wherein at least a third portion of the machine state data not transferred to the secondary memory is discarded.

19. The system of claim 17, wherein the first portion of the machine state data that is transferred to the secondary memory is stored in a non-volatile memory upon shutdown of the secondary processor.

20. The system of claim 17, wherein the primary and secondary memories are volatile memories.

21. The system of claim 17, wherein the primary memory comprises primary operating system instructions.

22. The system of claim 21, wherein the secondary memory comprises secondary operating system instructions.

23. The system of claim 22, wherein the secondary processor is in communication with a removable, non-volatile secondary memory device.

24. The system of claim 23, wherein the non-volatile secondary memory device is accessible from the primary operating system.

25. The system of claim 23, wherein the switch is controlled by the secondary processor.

26. The system of claim 23, wherein the switch is controlled by a low-power sensor and logic chip integrated with the switch.

27. The system of claim 26, wherein the low-power sensor comprises at least one of a voltage sensor and a current sensor.

28. The system of claim 23, further comprising a first display screen operable with the primary processor when the power source level is above the selected level, wherein the first display screen does not operate when the power source level is below the selected level.

29. The system of claim 28, further comprising a second display screen operable with the secondary processor when the power source level is below the selected level.

30. The system of claim 28, wherein the second display screen does not operate when the power source level is below the selected level.

* * * * *

UNITED STATES PATENT AND TRADEMARK OFFICE
CERTIFICATE OF CORRECTION

| | | |
|---|---|---|
| PATENT NO. | : 7,779,280 B2 | Page 1 of 1 |
| APPLICATION NO. | : 11/532863 | |
| DATED | : August 17, 2010 | |
| INVENTOR(S) | : Shuster | |

It is certified that error appears in the above-identified patent and that said Letters Patent is hereby corrected as shown below:

On the Title page, item (54), under "Title", Line 1, delete "LOW POWER" and insert
-- LOW-POWER --.

On the Title page, item (56), under "Other Publications", Line 2, below "2008." insert
-- International Search Report and Written Opinion of the International Searching Authority,
International Application No. PCT/US2006/036241, International Filing Date: Sept. 18, 2006. --.

Column 1, line 1, delete "LOW POWER" and insert -- LOW-POWER --.

Column 5, line 52, in Claim 9, delete "being in communication configured" and insert -- configured --.

Signed and Sealed this
Twenty-fourth Day of April, 2012

David J. Kappos
*Director of the United States Patent and Trademark Office*